Feb. 8, 1955  B. E. A. M. CUNY  2,701,501
APPARATUS FOR TESTING OF CENTERING, COAXIALITY, ALIGNMENT
Filed April 8, 1952

Inventor: BERNARD EUGENE
ADRIEN MARIE CUNY

By _____
Attorney

United States Patent Office 2,701,501
Patented Feb. 8, 1955

2,701,501

APPARATUS FOR TESTING OF CENTERING, COAXIALITY, ALIGNMENT

Bernard Eugène Adrien Marie Cuny, Paris, France

Application April 8, 1952, Serial No. 281,231

Claims priority, application France June 6, 1951

7 Claims. (Cl. 88—14)

The testing of centering, coaxiality, and alignment may be effected by means of an optical device defining an optical axis and with the aid of which divergences from various points sighted in relation to said optical axis are perceived. As the points sighted are disposed at variable distances from a fixed location, the device must necessarily contain an adjusting system which does not destroy the fixity of the optical axis from one sighted point to the next.

The main object of the present invention is to provide an optical testing device of this type, characterised by its extreme simplicity and also by the ease with which it gives an optical reference axis exactly coincident with the geometrical axis of the part supporting it.

Constructional forms of the invention are illustrated by way of example in the accompanying drawing forming a part hereof and wherein.

Figure 1:
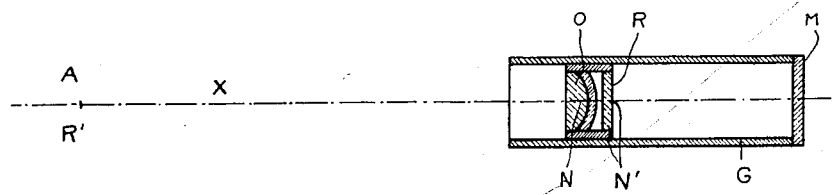
Fig. 1 is a diagrammatic view of a first embodiment of the invention.

The device illustrated in Fig. 1 comprises a fixed flat mirror M and an object lens-reticle assembly O, R, adapted to be displaced axially in a guide G perpendicular to the plane of the mirror M. The real or virtual reticle R is coincident with the nodal point N' (of the lens O) at the side of the object lens facing toward the mirror M. By virtual reticle is understood a reticle formed by the image of a real reticle included in an auxiliary optical system of the kind shown in Fig. 2 and hereinafter described in detail. The site of the images R' of the reticle R given by the lens O after reflection by the mirror M is an optical axis X perpendicular to the mirror M and passing through the focal point N (of the lens) in any of its positions permitted by the guide G. This axis X constitutes a straight reference line. Whether or not a point A is on the straight reference line X can be ascertained by forming the image of the point A in the plane of the reticle R by means of a focussing operation consisting of displacing the lens-reticle assembly O, R in its guide and examining whether the image of A coincides with the center of the reticle R.

Figure 2:
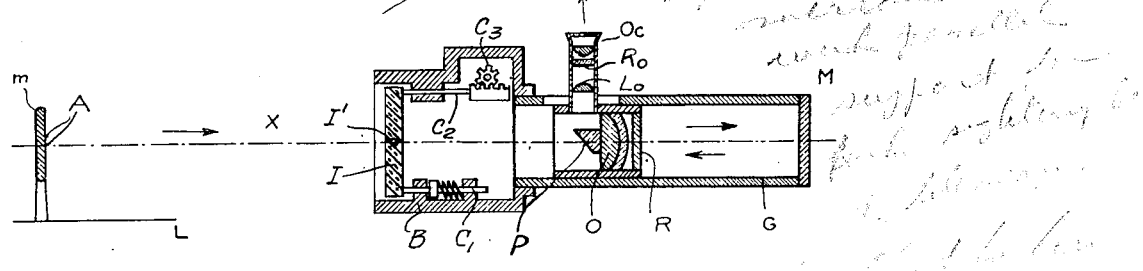
Fig. 2 is a diagrammatic view of another embodiment of the invention.

Figure 2 shows an embodiment in which the coincidence of the image of a sight $m$ with center A (which is displaced along the line L to be verified) and of the reticle R is observed by means of an ocular system Oc rigid with the assembly O, R and with a small total reflection prism P stuck to the center of the lens O. The assembly O, R, M, P, Oc then forms a telescope the focussing of which is effected by translation of the movable assembly O, R, P, Oc in the guide G.

In the embodiment of Fig. 2, the reference letter R indicates a virtual reticle which is the image of a real reticle $R_0$ located within the eye piece of the system Oc. The real reticle $R_0$, by reason of the lens $L_0$ of the system Oc and the prism P, has a virtual image thereof projected to a central location on the member previously indicated at R so that a virtual image of $R_0$ appears at R.

The image of the site A is formed in the plane of the virtual reticle R, and by means of the lens O, prism P and lens $L_0$, in the plane of the real reticle $R_0$, so that the coincidence of the image of the site A in the plane of the real reticle $R_0$ can be observed through the eyepiece Oc.

When the center of the site or point A does not lie on the geometrical axis of the guide cylinder G, the image of the site A in the plane of the virtual image of the reticle R can be made to coincide with the latter by angularly adjusting a plate I having parallel faces and rockably mounted between the prism P and the site A, and the angular adjustment of the plate I necessary to make the image of the site A coincide with the image R of the reticle is a measure of the displacement of the site A from the axis of the guide G.

The plate I is mounted in a housing B carried by the guide cylinder G, as an extension of the latter, and swings about an axis I'. Any suitable conventional mechanism may be employed for effecting the angular displacement of plate I and for measuring such displacement. For example, as shown in Fig. 2, a spring urged plunger $C_1$ acts against the lower portion of the plate to urge the upper portion of the plate against an adjusting plunger $C_2$ which is slidably carried by the housing B and is secured to a rack or the like in mesh with a gear $C_3$ driven, in turn, by a micrometer assembly (not shown).

Figure 3:
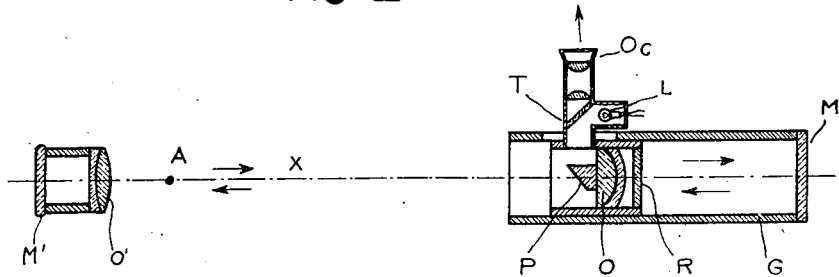
Fig. 3 is a diagrammatic view of still another embodiment of the invention.

Figure 3 illustrates another embodiment in which the previously described telescope is self-collimating. The reticle R is illuminated by the lamp L and the unsilvered mirror T. It is no longer sighted on a sight but on the optical center of a cataphote. In the figure, the cataphote is constructed by a lens O', at the rear focus of which is placed a mirror M', the optical center of the cataphote being the front focus A of the lens O'. The reticle illuminated by the light through the prism P and the objective lens O is reflected in the mirror M. The reflection of the illuminated reticle passes through the objective lens O and is returned by the cataphote O'M' to be reflected again by the mirror M, thereby to provide an image in the plane of the reticle R corresponding to the position of the cataphote relative to the axis X. Focusing is effected by movement of the mobile assembly within the guide G until the image of the reticle corresponding to the position of the cataphote is sharply produced in the plane of the reticle R. It is to be understood that the eye-piece Oc is at all times focused on the reticle R.

Figure 4:
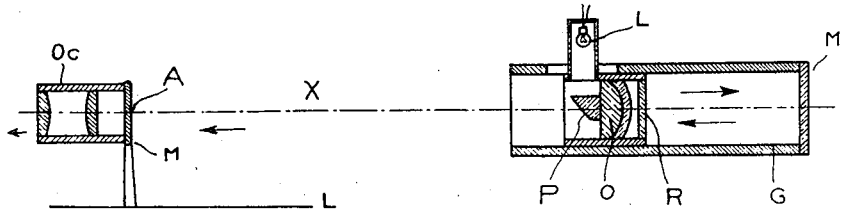
Fig. 4 is a diagrammatic view of still another embodiment of the invention.

Figure 4 illustrates a third embodiment in which the coincidence of the images of the reticle R and the center A of a sight is observed with the aid of an ocular system Oc placed behind the sight. The group O, R, M then forms a collimator the reticle R of which is illuminated by means of a lamp L and of the small total reflection prism P. The point A and the image of the illuminated reticle R reflected by the mirror M and passing through the objective lens O are jointly visible through the eye-piece Oc.

The advantage of the new arrangement embodying the invention resides in the fact that play in the guide gives an error which is only equal to that play, whatever the distance from the sighted point, whereas in systems utilising focussing by displacement of an internal lens, the errors are larger than that play.

The construction of the arrangement forming the subject of the invention will be facilitated by incorporating in the lens system forming the objective O (Figure 1) a lens of very small power mounted on eccentric rings, the operation of these rings permitting the nodal point N' to be brought into the perfect coincidence with the center of the reticle R.

What I claim is:

1. Apparatus for verifying optical alignment and parallelism comprising a fixed flat mirror, a guide extending perpendicular to the plane of said mirror, an assembly movable on said guide and including an objective lens having its optical axis extending parallel to said guide and reference means fixed relative to said objective lens at the nodal point of the latter at the side facing toward said mirror.

2. Apparatus according to claim 1; wherein said reference means at the nodal point is an image of a real reticle located remote from said nodal point of the objective lens.

3. Apparatus according to claim 1; wherein said reference means is formed by a reticle mounted at said nodal point of the objective lens and movable with the latter along said guide.

4. Apparatus according to claim 1; further comprising sighting means mounted rigidly on said assembly of objective lens and reference means and forming with said lens a telescopic optical system for sighting on a sight position.

5. Apparatus according to claim 4; wherein said sighting means and assembly are on one member the alignment of which with respect to another member is to be tested, and further comprising a cataphote on said other member and on which said telescopic system is sighted.

6. Apparatus according to claim 1; further comprising illuminating means operatively associated with said lens, reference means and mirror to form a collimator, said collimator being mounted on one member the alignment of which with respect to another member is to be tested, and an optical sighting device on said other member, said collimator forming an image of said reference means on said optical sighting device.

7. Apparatus according to claim 1; further comprising a micrometric device for displacing said reference means.

References Cited in the file of this patent

UNITED STATES PATENTS

| | | |
|---|---|---|
| 2,459,418 | Ellis | Jan. 18, 1949 |

FOREIGN PATENTS

| | | |
|---|---|---|
| 989,686 | France | May 30, 1951 |

OTHER REFERENCES

Southey: "Squaring the Camera to Copy," pages 585 and 586 in British Journal of Photography, vol. XCVII, November 10, 1950.

Microtecnic: "Huet Alignement Testing Collimator," pages 93–96 in Microtecnic, vol. V, No. 2, April 1951.